United States Patent [19]

Goldberg et al.

[11] 4,213,815

[45] Jul. 22, 1980

[54] CONTINUOUS PROCESS FOR PRODUCING, BY IRRADIATION, A MICROPOROUS RUBBER COMPOSITION SUITABLE FOR BATTERY SEPARATORS

[75] Inventors: Bruce S. Goldberg, Clifton; Mahendra Shah, Newark, both of N.J.

[73] Assignee: Amerace Corporation, New York, N.Y.

[21] Appl. No.: 915,917

[22] Filed: Jun. 16, 1978

[51] Int. Cl.² .......................... C08F 8/00; B29C 19/00
[52] U.S. Cl. .......................... 156/244.11; 204/159.15; 204/159.16; 204/159.17; 264/22; 264/171; 429/252; 429/254
[58] Field of Search ........... 204/159.2, 159.17, 159.16, 204/159.15; 429/254, 252; 156/244.11; 264/22, 171

[56] References Cited

U.S. PATENT DOCUMENTS

| | | | |
|---|---|---|---|
| 3,351,495 | 11/1967 | Larsen et al. | 136/146 |
| 3,383,248 | 5/1968 | Badgley et al. | 136/146 |
| 3,615,865 | 10/1971 | Wethrell | 136/146 |
| 3,956,020 | 5/1976 | Weininger et al. | 136/146 |
| 4,024,323 | 5/1977 | Versteegh | 429/249 |
| 4,049,757 | 9/1977 | Kammel et al. | 264/22 |

*Primary Examiner*—Richard B. Turer
*Attorney, Agent, or Firm*—S. Michael Bender; Fred A. Keire

[57] ABSTRACT

A continuous process for preparing a microporous flexible shape or sheet of a sulfur-free, cured polymeric material of a curable rubber, an ethylene-propylene copolymer or mixtures of the curable rubber and ethylene-propylene copolymer of a predetermined flexibility ranging from a drapable, conformable shape to a stiff material; electron beam curing of the curable polymeric material at low irradiation levels is one advantage of the continuous process as well as the capability of producing also backed materials using considerably thinner polymeric material layers thereon; the products obtained thereby are suitable as battery separators.

25 Claims, 2 Drawing Figures

FIG. 1 CONVENTIONAL MICROPOROUS RUBBER

CONTINUOUS PROCESS FOR PRODUCING, BY IRRADIATION, A MICROPOROUS RUBBER COMPOSITION SUITABLE FOR BATTERY SEPARATORS

This invention pertains to a continuous process for producing microporous articles made of polymeric materials; more particularly, this invention pertains to a continuous process for producing cured polymeric compositions by electron beam irradiation at heretofore unknown, low irradiation levels whereby products of an average pore size of less than 2 microns and, more commonly, less than one micron are obtained and whereby the article can be tailor-made to be of varying degrees of flexibility ranging from completely drapable material to a relatively stiff material, yet non-brittle and tough; the cured polymeric material deposited on a backed material may be made of thickness heretofore not possible.

BACKGROUND OF THE INVENTION

In commonly used electric storage batteries, such as the well known 12-volt battery employed in cars, it has been a desiratum to have a battery separator between the battery plates as thin as is possible to have the lowest possible electrical resistance. At the same time, it has been sought to obtain a battery separator which is reasonably flexible and yet does not develop failure in use.

Generally, a battery separator is needed as a spacer and to prevent two plates from touching each other causing a short. At the same time, a separator shall not impede the electrolyte flow. Also, a fine pore size is desirable to prevent dendrite growth developing between adjacent plates. The result of dendrite growth is a battery "short". It has been necessary not only to increase the battery plate spacing, but also to use battery separators to prevent a battery "short" for one or more of the reasons given above.

Various other problems have also resulted from spalling of the battery plates associated with the use of antimony or calcium additives to lead plates. Spalled deposits at the bottom of the battery have likewise caused shorts or premature failure of the battery. For this reason, it has been sought to have a battery which could be made in a manner whereby the battery separators could envelop or be festooned around the plates or made in a serpentine fashion thereby isolating one plate from the other.

However, the prior art battery separators have been invariably rather stiff and inflexible; complex shapes could only be formed with great difficulty.

Better quality batteries have, as separators, cured natural rubber compositions. A common disadvantage inherent in the use of rubber or natural rubber based battery separators is that a sulfur cure process produces rather stiff and brittle separators. Further, a sulfur cure process is capital intensive requiring compounding mixers, milling equipment, extruders, a battery of vulcanizers, etc. Sulfur curing of rubber battery separators is a batch process. A batch process is also labor and energy intensive. Still further, in order to maintain the desired porosity in a rubber battery separator provided by rehydrated silica, the separator must be sulfur cured in a water filled autoclave. Repeated raising and lowering the temperature of large amounts of water is very energy consuming.

In curing of the rubber composition, the cured articles are tested for cracking and brittleness. Unless very careful processing steps are followed in making sulfur cured separators, problems of brittle cracking often result.

BRIEF DESCRIPTION OF PRIOR ART

In order to solve problems associated with sulfur curing of rubber and battery separators produced from sulfur cured rubber, a number of different products and processes have been proposed.

As one process to offer a partial solution to the above problems, phenol formaldehyde resin impregnated webs, such as paper, have been prepared and used as battery separators. The polyphenol formaldehyde resin is generally cured to a B stage and produces a stiff battery separator. Processing of phenols and formaldehyde, disposal of residues thereof, and shortcomings of the end product, such as large pore size and poor oxidation resistance, has thus far limited the use of the process as well as the article.

As another approach to solving the prior art problems, a polyvinyl chloride (PVC) impregnated and/or coated web has been prepared and used as a battery separator. However, production of these webs require using solvent systems and solvent removal. It has become increasingly more difficult to meet the stringent solvent vapor tolerance limits imposed on the industry by government agencies. Further, a PVC web must be heat-embossed or hot-embossed to produce the necessary strength and ribbing for allowing electrolyte flow.

As another battery separator, a melt blown polypropylene mat has been proposed. However, in distinction from sulfur cured rubber, the pore size of the mat has been excessive and unacceptable for a battery separator. Moreover, high electrical resistance and difficulty in controlling the same has been encountered.

In general, these prior art substitute processes have required entirely new machinery and new processing techniques obsoleting existing facilities associated with sulfur curing of natural rubber.

Techniques for producing various permeable, microporous products have been disclosed, such as in U.S. Pat. Nos. 2,274,260, 2,329,322, 2,336,754, 2,686,142, 2,637,876, 3,298,869, 3,450,650, 3,773,540, 3,890,184, 3,900,341 and Canadian Pat. No. 1,020,184 and references mentioned in these patents.

BRIEF DESCRIPTION OF THE INVENTION

In accordance with the invention, a novel process has now been discovered for producing microporous articles, such as shapes or sheets of manufacture from curable rubbers, e.g., natural rubber, copolymers of ethylene and propylene, and mixtures of curable rubber and ethylene propylene copolymers. These articles are usefully employable, such as for battery separators, microporous filters, enzyme carriers, etc. The process has been found to be especially useful as it confers a number of advantages heretofore not possible to obtain when using the conventional technology such as sulfur curing natural rubber to obtain microporous articles. Thus, the present process provides a continuous operation with reduced number of process steps and allowing the employment of some of the existing compounding machinery and apparatus for producing the microporous sheets or shapes. Still further, in accordance with the present process, the steps which have been found necessary in the prior art processes and most objectionable from the standpoint of environmental problems, disposal of by-products, and energy requirements have now been eliminated.

As a result of the present processes and especially as a result of the curatives employed in the present process for curing the compositions, it has been surprisingly found that irradiation curing is now possible at irradiation levels so low for curing polymeric materials such that a process is now provided which not only is economically attractive, but also produces outstanding products of properties heretofore not achievable. For example, previously heavily sensitized natural rubber has been cured at 20 to 40 megarads, heavily sensitized styrene-butadiene rubber or nitrile-butadiene rubber has been cured at 14 to 15 megarads and heavily sensitized EPDM (ethylene-propylene-diene copolymer) at 12 to 14 megarads (at the same voltage and at the same thickness of sheet); in distinction therefrom, very good curing of the present composition has been achieved at 3 to 4 megarads without detrimentally affecting the polymer itself.

As a further advantage of the present process, a very thin, flexible microporous article is produced which, in turn, permits a thin or thinner layer of the microporous polymer material to be combined with an appropriate backing material. When practicing the present process, an article can be produced without fear of distortion, handling problems, and material failure, such as brittle failure.

In accordance with the present invention, tailor-made articles of great flexibility can be produced resulting in the elimination of solvent systems and elimination of heating and cooling of large amounts of water as well as elimination of batch processing operations.

The present process advantages reside in the discovery of the steps leading to the flexible material which comprise the proper compounding of the coacting combination of curable rubber, e.g., natural rubber, ethylene propylene copolymer, or mixtures of same with an especially suitable curative therefor properly proportioned (in combination with the polymeric material) and the above cured with rehydrated silica in the curing step. A synergistic result has been found when this combination has been irradiated with an electron beam thereby curing the composition at a low irradiation level and producing the results associated therewith such as of the order of 6 megarads and less. While it can be appreciated that curing at higher levels is possible, such as up to 8 or even 10 megarads, a number of disadvantages are evident, e.g., economic and safety factors, deteriorating properties, etc., hence, the preferred range is 4 megarads and less, i.e., amount sufficient to cure the desired composition within a reasonable time.

In curing of the polymeric materials employed herein in admixture with the curative, the added rehydrated silica material does not apparently affect the effectiveness of the irradiation, but has indeed contributed to a product which, such as when irradiated at preferred levels of 3 to 4 megarads, confer properties on the end product such as on a battery separator heretofore not achievable.

The invention will now be described by reference to the drawings wherein.

Figure 1:
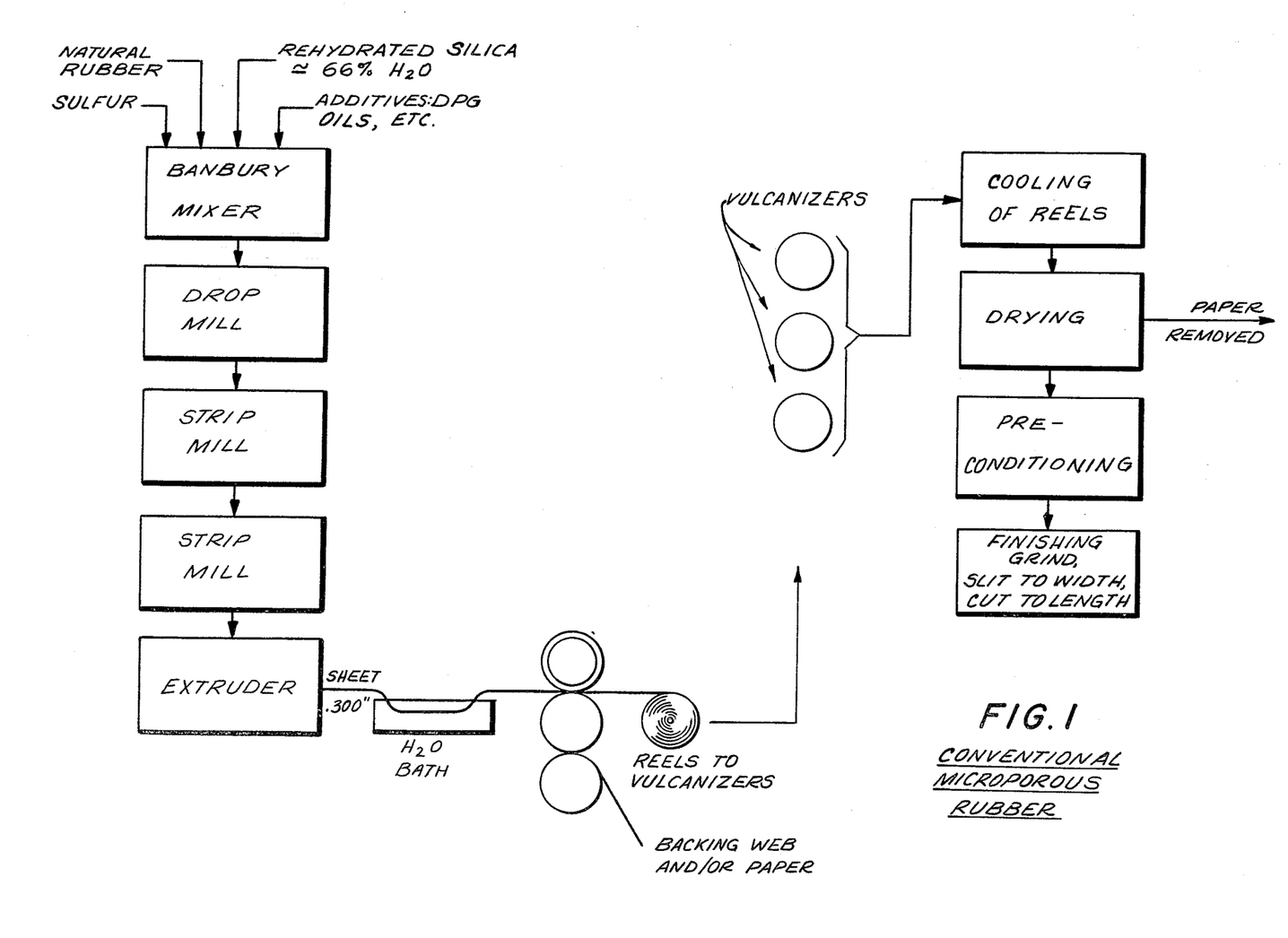
FIG. 1 is a schematic diagram illustrating the essential steps in a conventional process for producing microporous articles by sulfur curing of a suitable rubber compostiion.

By referring to the drawings herein, FIG. 1 shows a conventional process wherein in a Banbury mixer the compounding of natural rubber, the sulfur curative, rehydrated silica, and suitable processing additives, such as diphenyl guanadine, mixing aid, oil, etc. are added. The sequence or order for the addition of these are varied, but generally, the curative and silica are added last. The mixture is mixed until a suitable drop (discharge) temperature has been reached. Thereafter, the discharged mixture is further processed such as on a two-roll drop mill until again the desired temperature for the mixing is achieved. From this mill, a suitable strip is formed in a strip mill (often requiring milling on an additional strip mill for further processing thereof).

From the strip mill, the compounded, curable mixture goes to an extruder wherein a sheet such as of 0.300 inches thick is being extruded and is thereafter introduced into a water bath. Subsequently, a support web is added to the formed microporous article. A support web is needed so as not to distort the rubber upon vulcanization. As a support web, paper is conventionally used. After forming a roll of the extruded sheet of appropriate size, e.g., in diameter, the roll is ready for curing.

Each wound up reel is then transferred to a vulcanizer wherein water at an appropriate temperature is raised to achieve the cure at about 350° F.

The temperature is generally brought up at a steady rate of 40° F./min. under air pressure so as not to distort the sheet.

As soon as the microporous article is vulcanized, it is then cooled and discharged. So as not to again introduce distortion, cooling of the article is carefully conducted under pressure. Thereafter, drying of the cured article is carried out again in a batchwise manner in an appropriate dryer. In preconditioning, the support web is removed from the cured and dried sheet.

Inasmuch as in curing there is some distortion observed and inasmuch as it requires processing so as to remove the unwanted distortion, each of the sulfur cured article must be ground to obtain the desired contour. That is, proper dimensions and contours are obtained such as final thickness and ribbing for a battery separator. Thereafter, the article is slit to width and cut to length for packaging and sent to a manufacturer.

Figure 2:
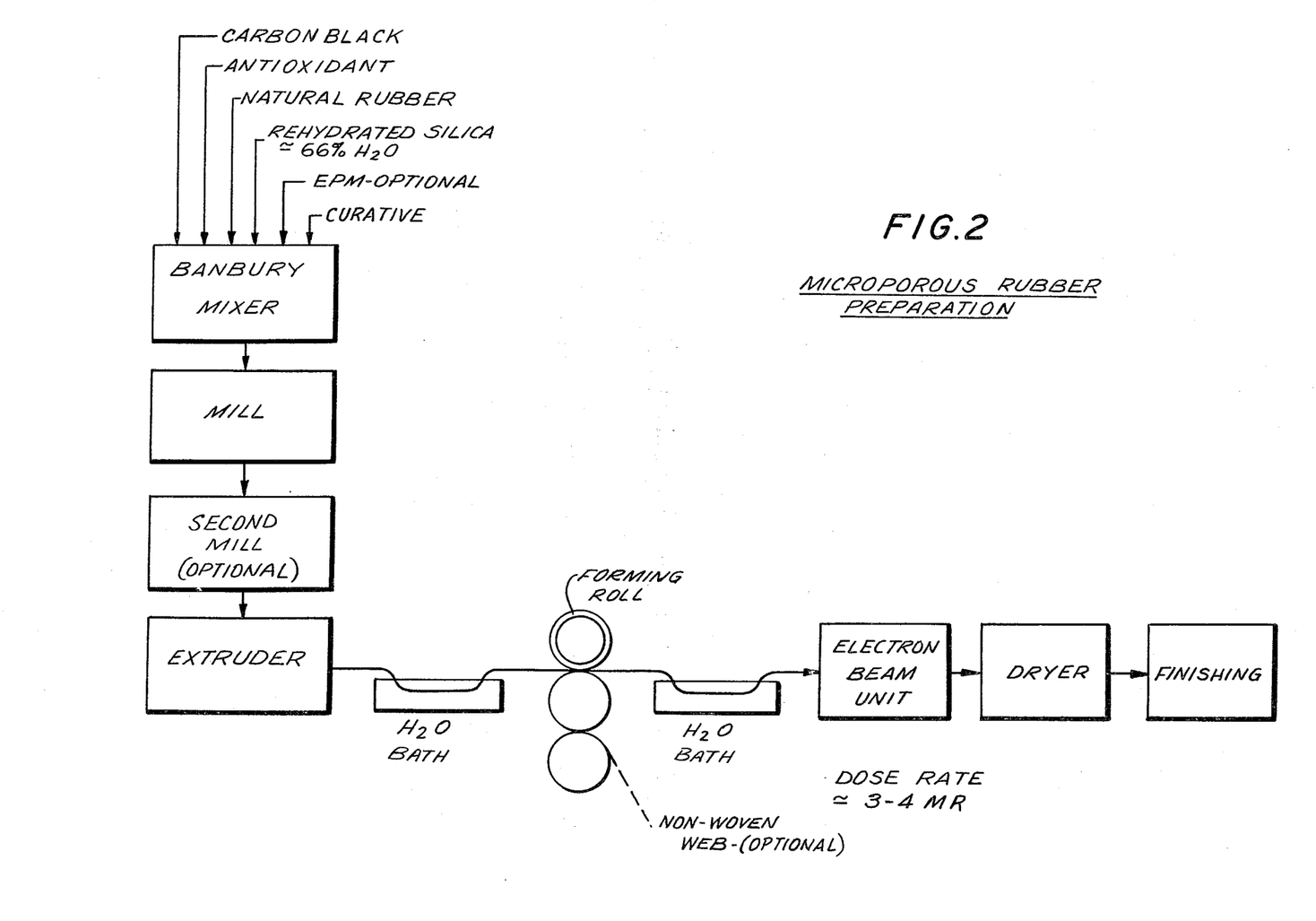
FIG. 2 is a schematic illustration of the herein disclosed process.

In referring to FIG. 2, it should be noted that the mixing of the components while indicated to be simultaneous actually follows the procedure described below. For preparation of the master batch and compounding of the polymeric material, a more detailed description will be given. The present description will serve to illustrate the advantages of the present process and the steps in the process as shown in FIG. 2.

As the process provides the most benefits when carried on continuously, the emphasis will be on the continuous aspects of the operation. In a suitably sized Banbury mixer or suitably sized series of mixers, the compositions disclosed herein are mixed. A next batch can be milled in time sufficient so that a two-roll mill can be at all times kept operating to feed ultimately to the extruder the mixed and compounded composition so as to maintain a continuous operation. Thus, Banbury mixers, the two-roll mills, and the extruder(s) are operated such that at all times a continuous supply is provided to the extruder(s). The extruded sheet coming from an extruder is introduced in a water bath so as to maintain the rehydration level of silica and as shown in FIG. 2. Again, if rehydration level can be appropriately controlled, the water bath may be optional. However, appropriate control of the amount of water in the mixture must be observed.

A suitable forming roll having the desired ribs or other configuration can be used to shape the article coming from the extruder and water baths. Advantageously, shaping of the sheet can be at an elevated temperature such as 110° F. to 140° F. After shaping, the continuously moving sheet is introduced into a water bath (optional) and therefrom into an electron beam unit which cures the composition at the indicated typical dose rate of 3 to 4 megarads.

From the electron beam unit, the cured sheet is then introduced into a dryer wherein the water of hydration is removed from silica and the microporosity thereby obtained. From the dryer, the sheet can then go to a finishing operation wherein the material is slit to width, cut to length, as well as packaged in the conventional manner.

Hence, as one aspect of the invention, a battery separator can now be readily produced according to the novel process and when so produced, the separator can be shaped to any desired contour and can be made of various thicknesses, including thicknesses heretofore unknown for rubber separators. These separators can also be made in combination with a backing material of thicknesses heretofore unknown for rubber separators. According to the present process, a very low resistance sheet is obtained of reduced thickness of the microporous material, improved tensile, tear, toughness, and resistance to distortion.

A superior product has also been produced by the present process as a coacting combination of the curable microporous rubber base material and a flexible backing material.

The curable composition is being claimed as such in a companion application filed on even date herewith U.S. Ser. No. 915,915.

The curable composition has been found to be especially suitable for electron beam curing in the presently disclosed process. Moreover, the composition displays the superior properties when used with curatives heretofore unknown for this purpose, but which are especially efficaceous when subjected to electron beam irradiation. The synergistically interacting polymeric compositions and the curative for it has resulted in a superior product produced at irradiation levels heretofore unknown, the product possessing properties heretofore unknown in the microporous rubber separator art. The interaction of curative with the polymeric system is another aspect of this invention because the end product, a cured polymeric material, can now be produced by a far simpler process.

DETAILED DESCRIPTION OF THE INVENTION AND EMBODIMENTS THEREOF

In the essential aspects, the process for producing from the microporous sheet material or any shape is best described by the following general example:

GENERAL EXAMPLE

A. Rehydration of Silica

The moisture content of the silica is determined first and then a correction is allowed for it before rehydration. Rehydration levels of 66.5% or 69.0% are typically employed, but can range from 65 to 70%. One thousand grams (1000 g) of silica are introduced into a blender and the corrected amount of water is pumped in at a rate of 800 to 900 cc/min. The pumping time of water should be fairly short of the order of few minutes as otherwise the blend gets too wet. After finishing the rehydration cycle, the blend is discharged and its moisture preserved. The blend should be in a powdered, friable form.

B. Masterbatch Procedure

The masterbatch preparation is desirable for obtaining a uniform mix of ethylene-propylene copolymer (EPM), curable rubber, or mixtures of same. Accordingly, the masterbatch consists in one embodiment of natural rubber, EPM, UV stabilizer, and carbon black. A required amount of EPM and natural rubber grind (about 1000 g as an illustration) are placed into a Banbury mixer and mixed for about 3-4 min. (at the second gear speed) until the temperature rises to 250° F. Then the ultraviolet light (UV) stabilizer and/or carbon black acting as a UV stabilizer are (is) added and the batch is dropped (discharged) at 275° F. Total time is about 5 minutes. During this operation, a small amount of warm water (at about 150° F.) is going through the rotors and body of the Banbury mixer to provide for temperature control. The total time required to make the masterbatch should be about 5 minutes. The masterbatch coming out of the Banbury mixer is placed on the two-roll mill (cold) and is sheeted out.

C. Compounding and Forming Procedure

A required amount of masterbatch (250-300 g) is milled on the two-roll cold mill until it became smooth (5 min.) and then placed in the Banbury mixer with diphenyl guanidine (DPG) as a mixing aid. The Banbury body temperature is 140° F. with no heat or cooling water circulated to the rotor. The Banbury mixing speed is at its slow speed and when the temperature reaches 150° F. one-half of the required amount of rehydrated silica with trimethylol propane trimethacrylate (TMPTM) are added. The composition is mixed until it again reaches 150° F. and then the rest of the rehydrated silica is added and is allowed to mix until it again reaches 150°-160° F. The composition is then dropped. A very uniform mix is obtained and the total Banbury mixing time is about 8 minutes. Thereafter on a two-roll mill, this mixture is milled for about 7 to 8 minutes. Both mill roll temperatures are 140° F. The milled sheet is then cut into small pieces and soaked in hot water for about 45 to 60 seconds at about 50°-85° C. and is then calendered for contours or optionally a backing is added thereto, such as paper or heat-bonded polyester mat. The temperature of both calender rolls is 130° F. The calandered sheet is cut into appropriate pieces, such as 15"×9" pieces, and is irradiated in an electron beam (EB) unit. After EB curing, these sheets are then dried at about 50°-100° C. to achieve the desired porosity.

D. Continuous Process

In a continuous process, instead as indicated in the foregoing part of the Example, after milling, a sheet is introduced into an extruder. A shape obtained from the extruder is immersed into a water bath at a temperature of 50°-85° C. so as not to lose any of the water of hydration associated with silica. Depending on the ability to control the amount of water in the shape, this water bath may or may not be needed. A water bath at this juncture does provide a ready means for careful control of the composition. From this water bath, the extruded shape travels through a forming roll such as to produce a sheet of the desired surface characteristics, for example, with ribs or other protuberances. If desired, a backing may be added to the polymeric material. Typically, an extruded sheet of the polymer, i.e., rubber or rubber and/or ethylene-propylene copolymer mixture is backed in the forming step.

From the forming roll, the sheet is again introduced into a water bath which is at a temperature about 25°-85° F., and then into an electron beam irradiation unit wherein the sheet is irradiated at a dose rate desirably 4 megarads or less. Irradiation at higher energy levels than 6 megarads, and sometimes even at that level causes the composition to become unduly embrittled. From the irradiation unit, the continuously moving sheet travels to a dryer where the water of rehydration associated with silica is being removed so as to obtain the desired porosity and pore size. From there, the sheet travels to the finishing operations where it is being slit, cut, and packaged in appropriate containers for shipping to manufacturers utilizing the microporous articles such as for a conventional car battery.

Although the general example illustrates a small scale process, a scale-up of the process has followed the same steps as in the described examples and the continuous process illustration.

The description of the various steps is given below to illustrate the scope of the invention as well as to provide further elaboration on the embodiment discussed above.

As starting material, natural rubber is No. 1 smoked sheet possessing Mooney viscosities of about 25°-30° at 175° F. On basis of plasticity, the natural rubber should be between about 14 to 18 rhm (rheometer-50 scan). In place of natural rubber, synthetic polyisoprene, the various stereo specific variants and polymers thereof are also within the contemplation of the present invention as are mixtures of same with natural rubber. Another polymer useful in the present process for the disclosed purposes is styrene-butadiene rubber (SBR), nitrilebutadiene rubber (NBR) or mixtures of above.

As a component, to impart the toughness, flexibility, and other desirable characteristics to the base composition, i.e., natural rubber, synthetic rubber, or mixtures of same, ethylene propylene copolymers have provided unexpected and desired properties in the combination with rubber or even by themselves. Although in the prior art, ethylene propylene copolymers are often either designated as ethylene propylene polymer or ethylene propylene monomer or ethylene propylene rubber, the more accurate description is a "copolymer consisting of ethylene and propylene" in various proportions typically ranging from 20 to 80% ethylene, balance propylene.

A particularly desirable combination of the ethylene propylene copolymer has been found to be one which has ethylene content of about 60% by weight in the copolymer, the polymer having a Mooney viscosity of about 30. This product is commercially available and known as EPCAR 306 and available from B. F. Goodrich & Co. Although other EPDM terpolymers have been investigated, the far-and-away preferred polymer is the ethylene propylene copolymer.

A more flexible product is obtained when rubber such as natural rubber is being used as the predominant or major component of the polymer in the composition up to and including 100% of the curable material. However, greater rigidity and stiffness is obtained when higher amounts of ethylene propylene copolymer is used, e.g., in amounts from 20 to 30%—more flexibility is obtained when the ethylenepropylene rubber is used in amounts as low as 3 to 5%. Appropriately cured microporous articles have been obtained solely from natural rubber or solely from ethylene propylene copolymer, mixtures of these, or mixtures of these, with other curable rubbers previously mentioned, curved with the above curative.

The curative for the above composition found to be especially suitable in the present process for either curable rubber or the ethylene propylene copolymer or mixtures thereof typically is an acrylate or a methacrylate of a polyol. The polyol may be a di, tri, or tetra functional polyol, the acrylate or methacrylate being formed with the hydroxyl groups of the polyol. Of the methacrylate or acrylate species, the methacrylate is preferred because of the vastly lesser problems of toxicity vis-a-vis the acrylate.

In the combination, typically the curative used is from 0.5 to 3 parts per weight per 100 parts of the rubber composition, ethylene propylene copolymer or the mixtures of same.

It has been found, however, that for certain articles of manufacture, such as battery separators, amounts of ethylene propylene copolymer in the mixture is desirably in the range from about 35 to 15%, most desirably, at about 20%. However, ratios of natural rubber to ethylene propylene to polymer such as of 70/10, 80/20, 75/25, 70/30, 60/40, 50/50, and up to 100 parts of ethylene propylene rubber have been evaluated. Various proportions of these components give various properties and thus allow to obtain the tailor-made characteristics.

Typically, carbon black is used from 0.5 to 3 parts per hundred (pph) of the polymer; and a UV stabilizer from 0.2 to 2 pph.

Of the various stabilizers, a butylated p-cresol dicyclopentadiene was found to be preferred. It is available as Wingstay-L from The Goodyear Tire & Rubber Co. Other stabilizers are such as styrenated diphenylamine (Wingstay 29 from The Goodyear Tire & Rubber Co.) and polymerized 1,2 dihydro-2,2,4 trimethylquinoline (FlectoAge from Monsanto Co.).

The silica powder is used for introducing the porisity in the polymer. It is readily obtainable. One type is Hi-Sil 233 available from Pittsburgh Plate Glass Co. Generally, the surface area for silica should be greater than 50 m$^2$/gr (B.E.T. procedure) and minimum oil absorption should be at least 100 cc of oil per 100 gr of silica (ASTM method D-281-31).

The amount of silica being used is, in proportions of rehydrated silica to rubber, from 3.0:1 to 8:1 by weight preferably 3.5:1 to 5.5:1 by weight at a silica rehydration level of about 65 to 70% and up to 75%. In general, the greater the rehydrated silica to rubber ratio, the lower is the electric resistance of a battery separator. At the greater silica ratios, the cured article is also less flexible.

Irradiation of the novel composition is accomplished by an electron beam unit rated at 850 kw and 50 mA and available under the name of Dynamitron from Radiation Dynamics, Incorporated at Melville, NY. For purposes of the present invention, any electron beam unit capable of imparting a radiation level of 6 megarads is acceptable. Time of irradiation and power needed is a function of sheet or shape thickness. Hence, any reference to irradiation level is to the same sheet or shape thickness. For this reason, it is best to express only the irradiation dose or level.

In using a backing, it has been found that the open structure of a non-woven web is of an excessive "pore size" to be acceptable as a battery separator; however, the flexibility of a proper web to which a sheet of the microporous article can be securely attached could heretofore not have been utilized for want of a flexible microporous sheet. Consequently, a flexible web and a fairly stiff, brittle microporous sheet still had to be of considerable thickness and hence, are not used. With a flexible microporous article and a flexible backing, the combination of the two allow the use of a thinner sheet of the microporous article, which is very advantageous not only because it provides less resistance in a battery, but also the more flexible sheet is less apt to be punctured, will not fail in flexing, and the flexible web for example adds virtually no resistance to the combination when used in an electrolyte. At the same time, the backing can be safely irradiated, provides a sufficient "body" to the polymeric material and allows use of a polymeric material as thin as 5 to 8 mils. A thicker layer, for example, up to 25 mils, can still be used. Consequently, each use will dictate the appropriate thickness of the microporous layer and the backing material.

As a backing material, a polyester non-woven, heat-bonded (in distinction from an adhesive-bonded) web has been found to be especially desirable. An average fiber length in these webs is typically about 0.8 inches. These webs are available from duPont and Co., such as under the trademark of Sontara 8000.

Properties of these webs are determined on basis of electrical resistance, tensile, and tear strength. For battery separators, electrical resistance added as a result of the backing should be no greater than 1 mΩ in$^2$/mil of thickness. Tensile strength should be about 1000 lb/in$^2$, elongation about 40%.

Tear strength for a base web of 1.2 oz/yard (yd), standard size, should be measured by grab breaking strength (ASTM Method D-1682-64) and should be about 22 and up in machine direction and 13 and up in cross-direction. Generally, webs of a weight from 0.75 oz/yd to 2.2 oz/yd are available.

In the description herein, parts or percent are by weight unless otherwise indicated.

TABLE I

THE EFFECT OF VARIOUS STABILIZERS

| | Formulation | | | |
|---|---|---|---|---|
| | A | B | C | D |
| Natural Rubber, g | 80 | 80 | 80 | 80 |
| EMP, g | 20 | 20 | 20 | 20 |
| Rehydrated Silica, g | 360 | 360 | 360 | 360 |
| Moisture in Silica, % | 66.5 | 66.5 | 66.5 | 66.5 |
| TMPTM, g | 3.0 | 3.0 | 3.0 | 3.0 |
| Wingstay 29, g | — | 1.0 | — | — |
| Wingstay-L, g | 1.0 | — | 1.5 | 2.0 |
| Total Dose, MR | 4 | 4 | 4 | 4 |
| Dose Rate/pass, MR | 2 | 2 | 2 | 2 |
| Thickness, in. | 0.018 | 0.015 | 0.023 | 0.020 |
| Electrical Resistance, mΩ in.$^2$ | 56 | 50 | 72 | 60 |
| MΩ in.$^2$/mil | 3.1 | 3.3 | 3.1 | 3.0 |
| Weight Loss in Chromic Acid, % | 6.0 | 10.0 | 7.5 | 8.0 |
| Comments before subjecting separator to fluorescent light | | ←flexible→ | | |
| Comments after subjecting separator to fluorescent light for 7 days | No crack within 7 days, but cheap crack after 2 weeks | Very cheap crack | Flexible after 2 weeks, cheap crack after folding many times | Very good. No cracks after 1 month |

TABLE II

THE EFFECT OF EPM BLENDING WITH NATURAL RUBBER AND THE EFFECT OF VARIOUS TMPTM LEVELS

| | E | F | G | H | I | J | K | L |
|---|---|---|---|---|---|---|---|---|
| Natural Rubber, g | 100 | 90 | 80 | 75 | 80 | 80 | 80 | — |
| EPM, g | — | 10 | 20 | 25 | 20 | 20 | 20 | 100 |
| Rehydrated Silica, g | 360 | 360 | 360 | 360 | 360 | 360 | 360 | 360 |
| Moisture in Silica, % | 66.5 | 66.5 | 66.5 | 66.5 | 66.5 | 66.5 | 66.5 | 61.9 |
| Dry Silica, g | — | — | — | — | — | — | — | 26 |
| TMPTM, g | 3 | 3 | 3 | 3 | 1.0 | 1.5 | 2.0 | 1.5 |
| Comments | ←good mix→ | | | slight mixing problem | ←Processed well→ | | | upside-down mix. Good process |
| 0 MR | | | | | | | | |
| Thickness, in. | 0.017 | 0.018 | 0.016 | 0.015 | 0.016 | 0.015 | 0.019 | 0.029 |
| Electrical Resistance, mΩ in.$^2$ | 54 | 54 | 48 | 57 | 50 | 47 | 57 | 58 |
| mΩ in.$^2$/mil | 3.2 | 3.0 | 3.0 | 3.8 | 3.1 | 3.1 | 3.0 | 2.0 |
| Tensile Strength, psi | 142 | 150 | 215 | 250 | — | — | — | — |
| Elongation, % | 14 | 13 | 10 | 5 | — | — | — | — |
| Weight Loss in Chromic Acid, % | | | | ←Not Recoverable→ | | | | |
| Comments | ←very flexible→ | | flexible, slightly stiffer | Cracked on one side | ←flexible→ | | | stiff, strong cracked when folded |
| 4 MR | | | | | | | | |
| Thickness, in. | 0.022 | 0.017 | 0.017 | 0.018 | 0.018 | 0.015 | 0.023 | 0.030 |

TABLE II-continued
THE EFFECT OF EPM BLENDING WITH NATURAL RUBBER AND THE EFFECT OF VARIOUS TMPTM LEVELS

|  | E | F | G | H | I | J | K | L |
|---|---|---|---|---|---|---|---|---|
| Electrical Resistance, mΩ in.$^2$ | 55 | 50 | 46 | 60 | 50 | 40 | 60 | 60 |
| mΩ in.$^2$/mil | 2.5 | 2.9 | 2.7 | 3.3 | 2.8 | 2.6 | 2.6 | 2.0 |
| Tensile Strength, psi | 146 | 152 | 220 | 245 | — | — | — | — |
| Elongation, % | 2 | 5 | 3 | 2 | — | — | — | — |
| Weight Loss in Chromic Acid, % | 50.0 | 35.0 | 8.0 | 8.0 | 30.0 | 6.0 | 8.0 | 2.0 |
| Comments | Very flexible & Flimsy | ←flexible→ | stiff | cracked on one side, stiff | ←flexible→ | | | stiff, tough, cracked |

TABLE III
FORMULATIONS STUDIED AT VARIOUS SILICA REHYDRATION LEVELS AND RATIOS OF REHYDRATED SILICA/RUBBER

|  | Formulation | | | | |
|---|---|---|---|---|---|
|  | 1-A | 1-B | 1-C | 1-D | 1-E |
| Natural Rubber | 80 | 80 | 80 | 80 | 80 |
| EPM, g | 20 | 20 | 20 | 20 | 20 |
| Rehydrated Silica, g | 360 | 433 | 480 | 433 | 468 |
| Moisture of Rehydrated Silica, % | 66.5 | 66.5 | 66.5 | 69.0 | 69.0 |
| Wingstay-L, g | 2 | 2 | 2 | 2 | 2 |
| DPG, g | 2 | 2 | 2 | 2 | 2 |
| Carbon Black, g | 0.5 | 0.5 | 0.5 | 0.5 | 0.5 |
| TMPTM, g | 1.5 | 1.5 | 1.5 | 1.5 | 1.5 |
| Theoretical Moisture, % | 51.5 | 53.4 | 54.47 | 55.4 | 56.3 |
| Plasticity | — | 14 | 16 | 15 | 18 |
| Time in Banbury, min. | 8 | 8 | 8 | 8 | 8 |
| Drop Temp. of Banbury, °F. | 160–165 | 160–165 | 160–165 | 160–165 | 160–165 |
| Time on Mill (140° F.), min. | 7 | 7 | 7 | 7 | 7 |
| Temperature of Water Bath, °F. | 185 | 185 | 185 | 185 | 185 |
| Time in Water Bath, secs. | 40 | 40 | 40 | 40 | 40 |
| Temperature of Calender, °F. | 130 | 130 | 130 | 130 | 130 |

TABLE IIIA
PHYSICAL AND ELECTRICAL PROPERTIES OF FORMULATIONS WITH VARIOUS SILICA REHYDRATION LEVELS AND RATIOS OF REHYDRATED SILICA/RUBBER

|  | Formulations | | | | | | | | | |
|---|---|---|---|---|---|---|---|---|---|---|
| 0 MR | 1-A | 1-A(B)* | 1-B | 1-B(B) | 1-C | 1-C(B) | 1-D | 1-D(B) | 1-E | 1-E(B) |
| Thicknesses, in. | 0.016 | 0.025 | 0.016 | 0.022 | 0.015 | 0.021 | 0.015 | 0.023 | 0.018 | 0.021 |
| Electrical Resistance, mΩ in.$^2$ | 46 | 54 | 39 | 32 | 30 | 34 | 36 | 42 | 33 | 36 |
| mΩ in.$^2$/mil | 2.9 | 2.2 | 2.4 | 1.5 | 2.0 | 1.6 | 2.4 | 1.8 | 1.8 | 1.7 |
| Tensile Strength, psi | 215 | 890 | 265 | 804 | 269 | 870 | 266 | 855 | 230 | 1030 |
| Elongation, % | 10.0 | 35.0 | 6.8 | 37.3 | 6.0 | 42.0 | 18.0 | 36.1 | 7.3 | 36.0 |
| Pounds to Break | — | — | 1.9 | 9.0 | 1.6 | 9.5 | 1.8 | 9.8 | 2.2 | 10.6 |
| Weight Loss in Chromic Acid, % | | | | | ←Not Recoverable→ | | | | | |
| Total Porosity, cc/g | — | — | 47 | 63 | 0.498 | 68 | 47 | 62 | 55 | 60 |
| Median Pore Diameter, μ | — | — | — | — | 0.059 | — | — | — | — | — |
| Moisture, % | 48.0 | — | 49.0 | — | 50.0 | — | 51.0 | — | 51.9 | — |
| Comments | very flexible | | | | ←Flexible→ | | | | | |
| 4 MR | | | | | | | | | | |
| Thickness, in. | 0.017 | 0.025 | 0.015 | 0.021 | 0.015 | 0.017 | 0.015 | 0.020 | 0.020 | 0.021 |
| Electrical Resistance, mΩ in.$^2$ | 44 | 46 | 30 | 32 | 30 | 25 | 31 | 30 | 38 | 38 |
| mΩ in.$^2$/mil | 2.6 | 1.8 | 2.0 | 1.5 | 2.0 | 1.5 | 2.1 | 1.5 | 1.9 | 1.8 |
| Tensile Strength, psi | 210 | 849 | 211 | 1190 | 247 | 1142 | 213 | 940 | 243 | 1022 |
| Elongation, % | 4.0 | 30.0 | 1.0 | 35.0 | 1.0 | 34.5 | 1.0 | 33.0 | 1.0 | 28.0 |
| Pounds to Break | — | — | 1.5 | 10.6 | 1.9 | 11.5 | 1.5 | 10.5 | 2.0 | 10.9 |
| Weight Loss in Chromic Acid, % | 8.0 | 5.3 | 8.0 | 6.0 | 8.0 | 5.0 | 9.0 | 8.0 | BP** | 10.0 |
| Alcohol Porosity | — | — | 47.0 | 61.0 | 61.0 | 66.0 | 46.0 | 63.0 | 50.0 | 66.0 |
| Total Porosity, cc/g | — | — | 0.513 | 0.894 | 0.533 | — | 0.499 | — | 0.525 | — |
| Median Pore Diameter, μ | — | — | 0.041 | 8.5 | 0.043 | — | 0.064 | — | 0.053 | — |
| Moisture, % | 48.0 | — | 48.0 | — | 48.0 | — | 51.0 | — | 53.0 | — |
| Comments | | | | | ←flexible and stiff→ | | | | | |

(B)-Sontara Backed
BP-Broken Pieces

In following the general example above, a composition was prepared consisting essentially of natural rubber—254 grams, TMPTM—7.6 grams, Hi-Sil—472 grams, water—875 grams. A cured product obtained from the above composition had a resistance of 1.3 mΩ in$^2$/mil and 33 mΩ in$^2$. The above illustrates the relative ratios of silica to rubber and the reduced resistance, but flexibility is also reduced.

Another composition was obtained by following the general example; the constituents of the same were are follows: 88.2 lbs. of 80% natural rubber; 15% EPCAR 306; 5% Pliolite S-6F (an 82.5% styrene, balance butadiene rubber (SBR) available from The Goodyear Tire & Rubber Co.); 139 lbs. Hi-Sil 233; 1.3 lbs. TMPTM; 1.7 lbs. DPG and 239.6 lbs. water. An electron beam cured article prepared from the above composition is suitable for forming various shapes or configurations of the cured material because the cured composition lends itself to ultrasonic welding. Accordingly, battery separators can be made as an envelope for a battery plate. It is to be understood that prior to curing, styrene-butadiene rubber and nitrile-butadiene rubber (NBR) are actually non-crosslinked, i.e., not thermoset polymers.

In the above described examples, weight loss in chromic acid is a typical gross test to establish unsaturation in the polymeric composition as well as useful life; an acceptable weight loss is less than 35%; it also typifies completion of curing and process efficiency with respect to crosslinking.

Similarly, shelf-life or storage stability of the cured microporous article is indicative of product life and is approximated by exposure to fluorescent light; typically, the composition should be good for at least 14 days before it develops cracks and loses flexibility.

The various measures of toughness of the unbacked, cured material are: tensile strength which should be in the range from 200 to 400 psi, preferably 300 to 400 psi. (For backed material, elongation in percent may be 20 to 90%, preferably 40 to 60%, and tensile strength up to 1200 psi.) Hence, is is now possible to produce very flexible shapes, i.e., conformable shapes when using thin sheets capable of great elongation; thicker sheets give tough, yet stiff products. Flexibility (non-brittleness) is easily measured by the 180° bend test and the present compositions easily meet this objective.

Again, while these values are generally pertinent to establish chemically desirable compositions, these values likewise can be used to establish the process variables vis-a-vis a standard.

A convenient measure of acceptable porosity is alcohol porosity and should be from 45 to 75%. Other measures of porosity have been given in the examples above and corresponding, comparably acceptable values can be obtained from the above, first given value.

The electrical resistance norms for the battery separator are easily achieved; typically for the present microporous article, a resistance of 1.0 to 2.5 mΩ/mil is acceptable.

As mentioned before, dimensional stability of the shape during processing is outstanding and careful conduct of the process eliminates grinding of the end product. These advantages for the unbacked and backed material show the various advantages of the present invention.

In use in a battery, the battery separator is tested by conventional tests known in the art, e.g., a "cold cranking" test and the "J-240" test identified by SAE testing procedures.

When employing a web, the thickness of the battery separator may be as little as 5 to 8 mils although typically a thickness of the separator is about 12 to 20 mils (backed) and from 10 to 20 mils without backing. Again, in a battery separator, the effectiveness of the thinner polymeric material on the web in combination is measured by the above two tests which also characterize the results of the process.

What is claimed is:

1. In a process for producing microporous polymeric material, the improvement comprising:
    compounding a sulfur free curable composition of a compound selected from the group consisting of curable natural rubber, polyisoprene, styrene-butadiene, nitrile-butadiene, and ethylene-propylene rubber, or a mixture of same with a curative for curing the composition by electron beam irradiation, said curative therefor being an ethylenically unsaturated curing agent of acrylate or methacrylate having more than one acrylate or methacrylate group present, or mixtures thereof, and rehydrated silica;
    continuously forming a shape of said composition; and
    continuously curing said formed shape by irradiation at an irradiation level of less than 10 megarads.

2. The process as defined in claim 1, wherein curing is at an irradiation level of less than 8 megarads.

3. In a process for producing microporous polymeric material, the improvement comprising:
    compounding a sulfur free curable composition of a curable rubber, a rubbery copolymer of ethylene and propylene, or mixtures of same with a curative for curing the composition by electron beam irradiation, said curative therefor being ethylenically unsaturated curing agent of acrylate or methacrylate having more than one acrylate or methacrylate group present, or mixtures thereof, and rehydrated silica;
    continuously forming a shape of said composition;
    continuously curing said formed shape by irradiation at an irradiation level of less than 8 megarads; and
    recovering said cured product.

4. The process as defined in claim 3, wherein curing is at an irradiation level of less than 6 megarads.

5. The process as defined in claim 1, wherein the curable rubber composition is natural rubber, a polyisoprene, styrene-butadiene rubber, nitrile-butadiene rubber, or mixtures of same.

6. The process as defined in claim 1, wherein the curable rubber composition is natural rubber.

7. The process as defined in claim 1, wherein the curable rubber composition is natural rubber and styrenebutadiene rubber mixture.

8. The process as defined in claim 1, wherein the curable composition is an ethylene-propylene rubber.

9. The process as defined in claim 1, wherein the curable composition is an admixture of natural rubber and an ethylene-propylene rubber.

10. The process as defined in claim 9, wherein an admixture of rubber and a copolymer of ethylene and propylene is from 65 to 95% by weight natural rubber and balance ethylene-propylene rubber.

11. The process as defined in claim 10, wherein in the admixture, rubber is 80% by weight.

12. The process as defined in claim 9, wherein the ethylene-propylene rubber has a Mooney viscosity of about 30.

13. The process as defined in claim 1, wherein during said continuous forming of said shape the curable composition is extruded.

14. The process as defined in claim 1, wherein during said continuous forming of said shape the curable composition is extruded and in shaping to final form, backed with a sheet of an inert polymer, non-woven, heat-bonded web.

15. The process as defined in claim 1, wherein said curative is a polyol diacrylate, a polyol triacrylate, a polyoltetraacrylate, a polyol dimethacrylate, a polyol trimethacrylate, a polyol tetramethacrylate or mixtures thereof.

16. The process as defined in claim 15, wherein the curative is a polyol acrylate or methacrylate and said polyol is trimethylol propane, pentaerythritol, triethylene glycol, 1,6-hexane diol or mixtures of these acrylates, methacrylates or both methacrylates with acrylates.

17. The process as defined in claim 1, wherein the formed shape is electron beam irradiated within an irradiation dose of 4 and less than 4 megarads.

18. The process as defined in claim 1, wherein the formed shape is a battery separator in a form used in an electric storage battery.

19. The process as defined in claim 18, wherein the formed shape of said battery separator is electron beam irradiated and the recovered product is of a predetermined flexibility.

20. The process as defined in claim 19, wherein said battery separator is backed with a non-woven, inert, heat-bonded polymeric material of a polyester.

21. The process as defined in claim 1, wherein the sulfur free curable composition comprises 80% by weight natural rubber, 20% by weight of a rubbery copolymer of ethylene and propylene having 60% by weight of ethylene as copolymer thereof, as a curative therefor trimethyolpropane trimethacrylate and rehydrated silica of 60 to 70% hydration, carbon black and a stabilizer therefor, said curable composition being curable via electron beam irradiation of less than 6 megarads.

22. The process as defined in claim 21, wherein the curable composition is cured of an irradiation level of 3 to 4 megarads.

23. In a process for producing microporous polymeric material from curable rubber, the improvement comprising:
    compounding a sulfur free curable composition selected from a group consisting of a natural rubber, polyisoprene, styrene-butadiene, nitrile-butadiene, an ethylene-propylene rubber or mixtures of same with
    (a) a curative for curing the same by electron beam irradiation, said curative being an acrylate or methacrylate of a di, tri, or tetra functional polyol or a mixture thereof, and
    (b) rehydrated silica;
    maintaining a predetermined moisture content in said curable composition during processing of same while forming a shape of said composition; an
    curing said formed shape by irradiation at an irradiation level of less than 8 megarads.

24. The process as defined in claim 23, wherein the moisture content of said composition is based on the amount of silica present and is determined on a ratio of rehydrated silica to the polymeric material in said curable composition and is from 3.0:1 to 7.0:1 by weight at a silica rehydration level of 65 to 75% by weight.

25. The process as defined in claim 24, wherein the rehydrated silica to rubber ratio is 3.6:1 to 5.3:1, at a rehydration level from 66 to 70%.

* * * * *